No. 748,882. PATENTED JAN. 5, 1904.
W. C. PETERS & W. BELLAMY.
LOCK NUT.
APPLICATION FILED JAN. 27, 1903.
NO MODEL.

Witnesses:
J. Snigg Poole
James T. Haney.

Inventors.
Walter C. Peters, and
William Bellamy.
by Herbert W. T. Jenner.
Attorney.

No. 748,882. Patented January 5, 1904.

UNITED STATES PATENT OFFICE.

WALTER CLAY PETERS AND WILLIAM BELLAMY, OF ELY, ENGLAND.

LOCK-NUT.

SPECIFICATION forming part of Letters Patent No. 748,882, dated January 5, 1904.

Application filed January 27, 1903. Serial No. 140,789. (No model.)

*To all whom it may concern:*

Be it known that we, WALTER CLAY PETERS and WILLIAM BELLAMY, subjects of the King of Great Britain and Ireland, residing at Parkdale, Witcham, Ely, in the county of Cambridge, England, have invented certain new and useful Improvements in Lock-Nuts; and we do hereby declare the following to be a full, clear, and exact description of the invention, such as will enable others skilled in the art to which it appertains to make and use the same.

This invention relates to a new or improved lock-nut, the object being to provide a lock-nut which, while of extremely simple construction, is of such a form that it can be readily secured in the required position upon any screw-threaded rod, spindle, or the like and when in the required position is not liable to work loose from vibration or from any similar cause.

In order that this invention may be fully understood, it will now be described with reference to the accompanying drawings, in which—

Figure 1:
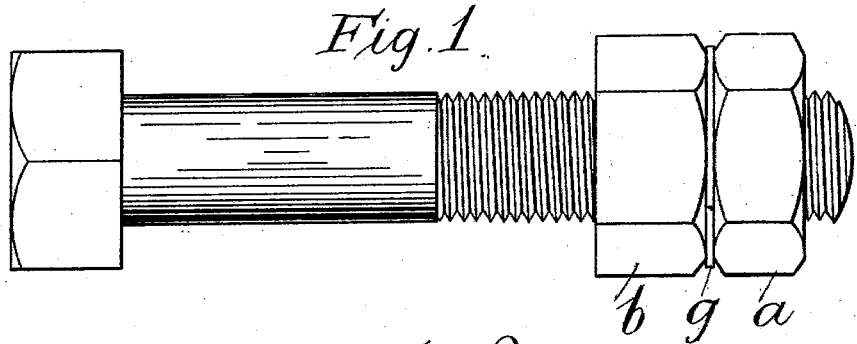
Figure 2:
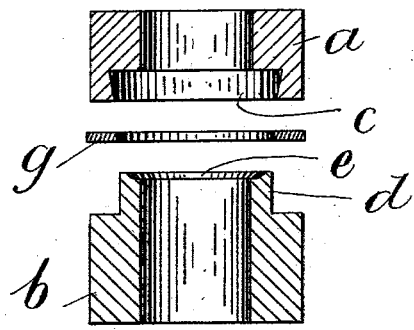
Figure 3:
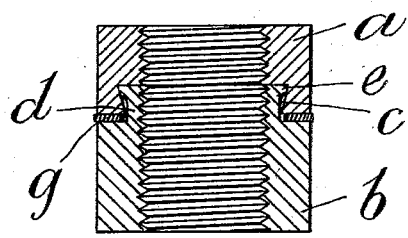

Figure 1 is a side elevation showing the nut mounted on the extremity of a bolt. Fig. 2 is a cross-section through the parts constituting the complete nut before being secured together, and Fig. 3 is a cross-section through the complete nut.

In carrying this invention into practical effect the nut is formed in two parts $a$ $b$, the one part being provided with a circular recess $c$, having undercut sides, while the second part is provided with a circular outwardly-projecting part $d$ of such a diameter as to be capable of just passing through and into the recess $c$, while the forward extremity of the projecting part $d$ is turned down from the inside, so as to form a comparatively thin lip $e$, and a washer $g$ is arranged between the two parts.

In assembling the parts the projecting portion $d$ is passed through the washer $g$ into the recess $c$ of the second part. The nut is then placed on a suitable hard surface and struck or compressed by means of a hammer or the like, so as to expand the lip $e$ within the recess $c$, as shown at Fig. 2, and the completed nut is then tapped.

One face of each portion of the nut is provided with a suitable distinguishing-mark, and in practice the two parts of the nut are brought to the required position by means of the distinguishing-marks and the nut screwed on as a whole, and when the required position has been reached the outer portion is turned over the inner portion sufficiently to rigidly jam or lock the two parts together.

The main part $d$ of the projection remains cylindrical after the nuts are completed, the lip $e$ only forming a projection at the end of the cylindrical part $d$. The washer $g$ prevents the two nuts from jamming fast when struck upon the line of their axis, and it surrounds the cylindrical part $d$.

What we claim is—

A nut-lock, comprising two nuts, one of which has an undercut recess, and the other of which has a cylindrical projection provided with a projecting lip at its extreme end which engages with the bottom part of the said recess, and a washer on the said cylindrical projection between the said two nuts.

In testimony whereof we affix our signatures in presence of two witnesses.

WALTER CLAY PETERS.
WILLIAM BELLAMY.

Witnesses:
G. SHEPHERD,
CHAS. LEASON.